United States Patent
Vrame et al.

(10) Patent No.: US 6,683,248 B2
(45) Date of Patent: Jan. 27, 2004

(54) PROTECTIVE COVER ENABLING VIEW OF ELECTRICAL DEVICE IN ELECTRICAL BOX HAVING PLASTER RING

(75) Inventors: Paul A. Vrame, 1341 Fountain Green Dr., Crystal Lake, IL (US) 60014; Peter A. Vrame, Barrington Hills, IL (US)

(73) Assignee: Paul A. Vrame, Crystal Lake, IL (US)

( * ) Notice: Subject to any disclaimer, the term of this patent is extended or adjusted under 35 U.S.C. 154(b) by 70 days.

(21) Appl. No.: 09/934,200

(22) Filed: Aug. 21, 2001

(65) Prior Publication Data

US 2003/0037949 A1 Feb. 27, 2003

(51) Int. Cl.$^7$ .................................................. H01J 5/00
(52) U.S. Cl. .......................... 174/50; 174/58; 174/67; 174/66; 220/241; 220/242; 33/528
(58) Field of Search ........................... 174/48, 50, 17 R, 174/58, 63, 135, 66, 67, 60, 64; 220/3.2, 3.8, 4.02, 3.3, 3.92, 241, 242, 3.94; 248/906; 439/535; 33/528; D13/156, 177

(56) References Cited

U.S. PATENT DOCUMENTS

| | | |
|---|---|---|
| 1,550,870 A | 8/1925 | Braden |
| 1,724,307 A | 8/1929 | Peterson |
| 1,935,565 A | 11/1933 | Goetzelman |
| 1,956,196 A | 4/1934 | Korab |
| 2,204,006 A | 6/1940 | Allen et al. |
| 2,288,377 A | 6/1942 | Tuttle |
| 2,398,901 A | 4/1946 | West |
| 2,573,260 A | 10/1951 | Gorman |
| 2,895,634 A | 7/1959 | Comroe |
| 3,015,408 A | 1/1962 | Campbell et al. |
| 3,015,409 A | 1/1962 | Campbell et al. |
| 3,061,083 A | 10/1962 | Hubbell, Jr. |
| 3,253,730 A | 5/1966 | Mount |
| 3,601,276 A | 8/1971 | Culpepper |
| 4,780,573 A | * 10/1988 | Own .......................... 174/66 |
| 4,907,711 A | 3/1990 | Stuchlik, III |
| 4,915,638 A | * 4/1990 | Domian ................... 174/67 X |

(List continued on next page.)

OTHER PUBLICATIONS

"Adjust–A–Ring" brochure (four pages photocopied onto two pages) of Ideal Products, Inc. Wichita, Kansas—undated—admitted to be prior art.

*Primary Examiner*—Dean A. Reichard
*Assistant Examiner*—Dhiru R Patel
(74) *Attorney, Agent, or Firm*—Wood, Phillips, Katz, Clark & Mortimer

(57) ABSTRACT

For an electrical box having an open front, mounting an electrical device, and having a plaster ring, which fastens to the electrical box, around the open front, and which has a projecting portion defining a generally rectangular aperture providing access to the electrical device, through the open front, after the electrical box, the electrical device, and the plaster ring have been installed behind a wall panel, such as a drywall panel, a protective cover is mountable removably to the plaster ring so as at least substantially to cover the generally rectangular aperture of the plaster ring, whereby to protect the electrical device against foreign matter, damage, or both while an aperture accommodating the projecting portion of the plaster ring is cut into the wall panel or while the wall panel is being decorated near the aperture accommodating the projecting portion of the plaster ring. In one contemplated embodiment, the protective cover is made from steel and has a window, which has a transparent sight made from a transparent, polymeric material enabling a person to view the electrical device through the generally rectangular aperture of the plaster ring and through the open front of the electrical box while the protective cover is mounted to the plaster ring. In another contemplated embodiment, the protective cover in its entirety is made from such a transparent, polymeric material.

7 Claims, 1 Drawing Sheet

U.S. PATENT DOCUMENTS

| | | | |
|---|---|---|---|
| 4,953,733 A | | 9/1990 | Loscuito |
| 4,979,633 A | | 12/1990 | Lakey |
| 5,003,128 A | | 3/1991 | Grondin |
| 5,012,043 A | | 4/1991 | Seymour |
| 5,045,640 A | * | 9/1991 | Riceman ........................ 174/67 |
| 5,280,135 A | * | 1/1994 | Berlin et al. ................... 174/67 |
| 5,375,728 A | | 12/1994 | West |
| 5,455,388 A | * | 10/1995 | Pratt ............................ 174/67 |
| 5,526,952 A | | 6/1996 | Green |
| 5,562,222 A | | 10/1996 | Jordan et al. |
| 5,639,991 A | | 6/1997 | Schuette |
| 5,675,125 A | * | 10/1997 | Hollinger ...................... 174/66 |
| 5,773,760 A | | 6/1998 | Stark et al. |
| 5,931,325 A | * | 8/1999 | Filipov ......................... 220/3.7 |
| 6,166,329 A | * | 12/2000 | Oliver et al. .................. 174/58 |
| 6,172,301 B1 | * | 1/2001 | Goodsell ...................... 174/66 |
| 6,229,087 B1 | * | 5/2001 | Archer ......................... 174/50 |
| 6,479,749 B1 | * | 11/2002 | Vrame .......................... 174/67 |

* cited by examiner

PROTECTIVE COVER ENABLING VIEW OF ELECTRICAL DEVICE IN ELECTRICAL BOX HAVING PLASTER RING

FIELD OF THE INVENTION

This invention pertains to a protective cover for an electrical box having an open front, mounting an electrical device, such as an electrical switch or an electrical outlet, and having a plaster ring having a generally rectangular aperture. As improved by this invention, the protective cover enables a person to view the electrical device through the generally rectangular aperture of the plaster ring and through the open front of the electrical box while the protective cover is mounted to the plaster ring.

BACKGROUND OF THE INVENTION

As exemplified in U.S. Pat. No. 5,012,043 and in U.S. Pat. No. 6,166,329, it has been known heretofore to employ a protective cover, which is made of steel, for an electrical box having an open front, mounting an electrical device, such as an electrical switch or an electrical outlet, and having a plaster ring, which fastens to the electrical box, around the open front of the electrical box, and which has a projecting portion defining a generally rectangular aperture providing access to the electrical device, through the open front of the electrical box, after the electrical box, the electrical device, and the plaster ring have been installed behind a wall panel, such as a drywall panel.

As known heretofore, the protective cover is mountable removably to the plaster ring so as substantially to cover the generally rectangular aperture of the plaster ring, whereby to protect the electrical device against foreign matter, such as dust and debris, and against damage, such as damage from a router bit or from a saw blade, while an aperture accommodating the projecting portion of the plaster ring is cut into the wall panel, or against foreign matter, such as paint, wallpaper adhesive, or drywall-finishing material, i.e., so-called "mud", while the wall panel is being decorated near the aperture accommodating the projecting portion of the plaster ring. If the protective cover were not utilized and if the router or the saw blade were to slip, the electrical device could be badly damaged.

At least as early as 1997, a protective cover was available commercially from Ideal Products, Inc. of Wichita, Kans., which cover had lateral formations adapted to coact with lateral edges of the generally rectangular aperture of the projecting portion of a plaster ring, whereby to mount the cover removably to the plaster ring so as substantially to cover the generally rectangular aperture of the plaster ring.

Although the protective covers known heretofore may function well to protect an electrical device against foreign matter, damage, or both, as discussed above, the protective covers known heretofore do not enable an installer, an inspector, or any other person to view the electrical device while the protective cover is mounted to the plaster ring.

SUMMARY OF THE INVENTION

This invention improves a protective cover for use with an electrical box having a plaster ring, as explained above, whereby the protective cover enables an installer, an inspector, or any other person to view the electrical device while the protective cover is mounted to the plaster ring. There is no need to remove the protective cover to enable such a person to view the electrical device.

In one contemplated embodiment, at least a portion of the protective cover defines a window enabling a person to view the electrical device through the generally rectangular aperture of the plaster ring and through the open front of the electrical box while the protective cover is mounted to the plaster ring.

Preferably, in the embodiment mentioned in the preceding paragraph, the protective cover is made from steel and has an aperture defining the window. Preferably, moreover, the aperture defining the window has a transparent sight to prevent foreign matter from entering the electrical box through the window, through the generally rectangular aperture of the plaster ring, and through the open front of the electrical box. Preferably, the transparent sight is made from a transparent, polymeric material, such as polycarbonate.

In another contemplated embodiment, at least a portion of the protective cover is made from a transparent, polymeric material enabling a person to view the electrical device through the generally rectangular aperture of the plaster ring and through the open front of the electrical box while the protective cover is mounted to the plaster ring.

Preferably, in the embodiment mentioned in the preceding paragraph, the protective cover in its entirety is made from a transparent, polymeric material enabling a person to view the electrical device through the window, through the generally rectangular aperture of the plaster ring, and through the open front of the electrical box while the protective cover is mounted to the plaster ring. Preferably, the transparent, polymeric material is polycarbonate.

DETAILED DESCRIPTION OF THE ILLUSTRATED EMBODIMENTS

Figure 1:
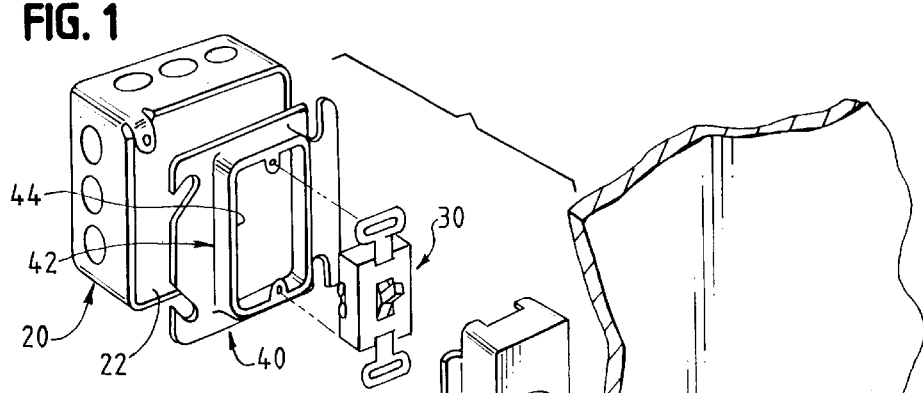
FIG. 1 is a fragmentary, perspective, exploded view of a protective cover of one contemplated construction embodying this invention, as utilized with an electrical box mounting an electrical switch and having a plaster ring having a projecting portion, so as to protect the electrical device against foreign matter, damage, or both while an aperture accommodating the projecting portion of the plaster ring is cut into a wall panel, via a router.
Figure 2:
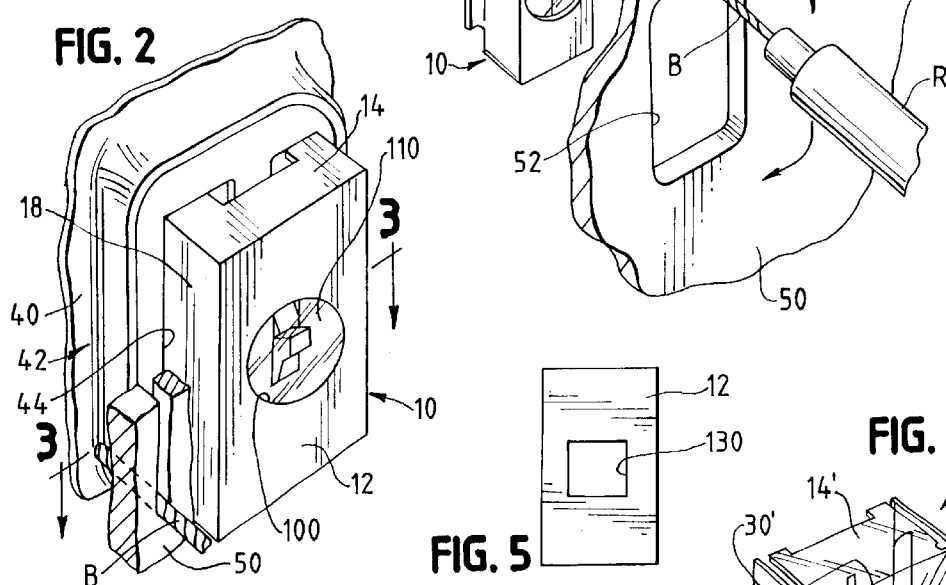
FIG. 2, on a larger scale compared to FIG. 1, is a fragmentary, perspective, assembled view of the protective cover and other elements, as shown in FIG. 1, the electrical switch being shown fragmentarily to show that a person can view the electrical switch through a window in a front wall of the protective cover.
Figure 3:
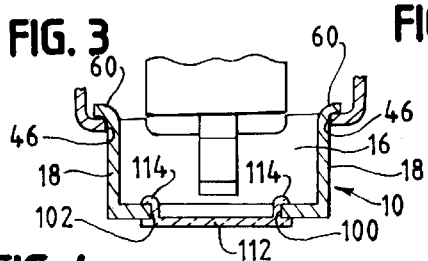
FIG. 3, on a similar scale, is a fragmentary cross-section taken along line 3—3 in FIG. 2, in a direction indicated by arrows and showing a transparent sight mounted to the front wall at margins of the window in one contemplated arrangement.

As shown in FIGS. 1, 2, and 3, a protective cover 10 stamped from a sheet of galvanized or stainless steel so as to be box-like and so as to have a front panel 12, a top flange 14, a bottom flange 16, and two lateral flanges 18 is provided for an electrical box 20 made of galvanized or stainless steel, having an open front 22, mounting an electrical switch 30, and having a plaster ring 40, which is made of galvanized or stainless steel, which fastens to the electrical box 20 via fasteners (not shown) in a known manner, around the open front 22 of the electrical box 20, and which has a projecting portion 42 defining a generally rectangular aperture 44 providing access to the electrical switch 30, through the open front 22 of the electrical box 30, after the electrical box 20, the electrical switch 30, and the plaster ring 40 have been installed behind a wall panel 50, such as a drywall panel.

Because the top flange 14 and the bottom flange 16 are not joined to the lateral flanges 18 except via the front panel 12, the lateral flanges 18 can be inwardly flexed. Each of the lateral flanges 18 of the protective cover 10 has a vertically elongate tab 60, which is adapted to coact with a lateral margin 46 of the generally rectangular aperture 44 of the projecting portion 42 of the plaster ring 40, when the lateral flanges 18 are flexed inwardly, so as to mount the protective cover 10 removably to the projecting portion 42 of the plaster ring 40 in a manner known from the protective cover that was available commercially from Ideal Products, Inc. of Wichita, Kans., as discussed above. Alternatively, the protective cover 10 is mounted removably to the projecting portion 42 of the plaster ring 40 in any other manner known from U.S. Pat. No. 5,012,043 and in U.S. Pat. No. 6,166,329, the disclosures of which two patents are incorporated herein by reference.

As shown in FIGS. 1, 2, and 3, it is common to utilize a router R having a rotary bit B to cut an aperture 52 accommodating the projecting portion 42 of the plaster ring 40 into the wall panel 50 after the electrical box 20, the electrical switch 30, and the plaster ring 40 have been installed behind the wall panel 50. The protective cover 10 is utilized to protect the electrical switch 30 against foreign matter, such as dust and debris, and against damage, as such as damage from a router bit, while the aperture 52 is cut into the wall panel 50. The protective cover 10 can be then utilized to protect the electrical switch 30 against foreign matter, such as paint, wallpaper adhesive, or drywall-finishing material, while the wall panel 50 is being decorated near the aperture 52. After the wall panel 50 has been decorated near the aperture 52, the protective cover 10 can be then removed so as to permit a decorative plate (not shown) to be then installed in a known manner.

As improved by this invention, the protective plate 10 has a circular window 100 in its front wall 12. The circular window 100 enables an installer, an inspector, or any other person to view the electrical switch 30 while the protective cover 10 is mounted to the plaster ring 40. There is no need to remove the protective cover 10 to enable such a person to view the electrical switch 30. In a simplified embodiment, in which the protective cover 10 is utilized to protect the electrical switch 30 against damage from the router bit B but not against dust or debris from cutting of the aperture 52 and in which the protective cover 10 can be alos utilized to protect the electrical switch 30 against paint, wallpaper adhesive, or drywall-finishing material, the circular window 100 is open and is not protected by a transparent sight.

Preferably, so as to protect the elctrical switch 30 from dust or debris from cutting of the aperture 52, the circular window 100 is protected by a transparent sight 110, which can be advantageously is made from a transparent, polymeric material, such as polycarbonate, as by injection molding or by thermo-forming. Preferably, as shown in FIG. 3, the transparent sight 110 is provided by a transparent, circular wafer 112 having integrally molded tabs 114, which can be snap-fitted over the margin 102 of the window 100.

Figure 4:
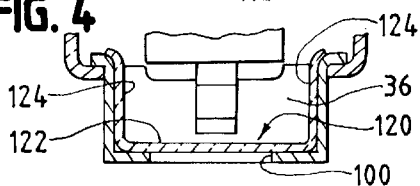
FIG. 4, on a similar scale, is a fragmentary cross-section taken similarly but showing a transparent sight mounted across the window in an alternative arrangement.

Alternatively, as shown in FIG. 4, the transparent sight 110 is provided by a transparent, box-like insert 120 having a front wall 122 bearing against the front wall 12 of the protective cover 10 and having two lateral flanges 124 bearing against the lateral flanges 18 of the protective cover 10. The transparent, box-like insert 120 may have a top flange (not shown) bearing against the top flange 14 of the protective cover 10 but not joined to the lateral flanges 124 except via the front wall 122 and a bottom flange (not shown) bearing against the bottom flange 16 of the protective cover 10 but not joined to the lateral flanges 124 except via the front wall 122.

Figure 5:
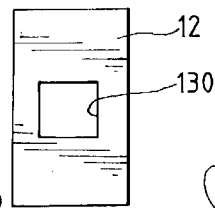
FIGS. 5, 6, and 7, on a smaller scale compared to FIGS. 2 and 3, are front elevations of protective covers embodying this invention and having plural windows in alternative arrangements.
Figure 6:
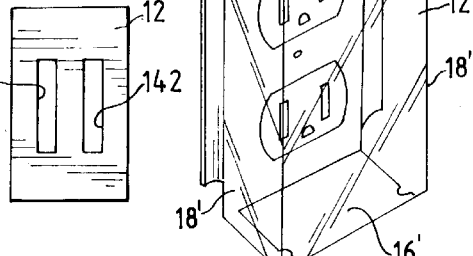
Figure 7:
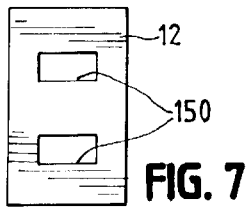

As shown in FIG. 5, the front wall 12 of the protective cover 10 may have a square window 130, rather than the circular window 100. As shown in FIG. 6, the front wall 12 of the protective cover 10 may have two vertically elongate, rectangular windows 140, rather than the circular window 100. As shown in FIG. 7, the front wall 12 of the protective cover 10 may have two horizontally elongate, rectangular windows 150, rather than the circular window 100. Other numbers of windows and other shapes of windows may be alternatively provided.

Figure 8:
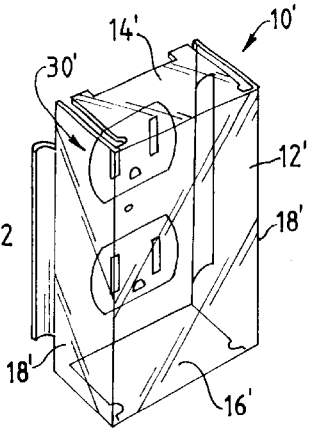
FIG. 8, on a scale similar to that of FIGS. 2 and 3, is a perspective view of a protective cover of an alternative construction embodying this invention, an electrical outlet being shown fragmentarily to show that a person can view the electrical outlet through the protective cover.

As shown in FIG. 8, a protective cover 10' having a front wall 12', a top flange 14', a bottom flange 16', and two lateral flanges 18' is similar to the protective cover 10 and is utilized similarly, except that the protective cover 10' in its entirety is made from a transparent, polymeric material, such as polycarbonate, as by injection molding or by thermo-forming. FIG. 8 shows, fragmentarily, an electricl outlet 30', rather than the electric switch 30. Being transparent, the front wall 12' and each of the respective flanges 14', 16', 18', enable an installer, an inspector, or any other person to view the electrical switch 30' while the protective cover 10' is mounted to the plaster ring (not shown) similar to the plaster ring 40.

What is claimed is:

1. A protective cover for an electrical device mounted within an electrical box having an open front, a plaster ring being mountable to the electrical box, the plaster ring defining a generally rectangular aperture having two lateral margins, the protective cover having a front panel, a top flange, a bottom flange, and two lateral flanges, which are not joined to the top and bottom flanges except via the front panel, wherein each of the lateral flanges has a vertically elongate tab, which is adapted to coact with one of the lateral margins so as to mount the protective cover detachably to the plaster ring.

2. The protective cover of claim 1, wherein at least a portion of the protective cover defines a window enabling a person to view the electrical device through the generally rectangular aperture of the plaster ring while the protective cover is mounted to the plaster ring.

3. The protective cover of claim 2, wherein the protective cover is made of steel and has an aperture defining the window.

4. The protective cover of claim 3, wherein the aperture defining the window has a transparent sight to prevent foreign matter from entering the electrical box through the window, through the generally rectangular aperture of the plaster ring, and through the open front of the electrical box.

5. The protective cover of claim 4, wherein the transparent sight is made from a transparent material.

6. The protective cover of claim 5, wherein the transparent material is polymeric.

7. The protective cover of claim 1, wherein the protective cover is made entirely from a transparent, polymeric material.

* * * * *